Figures 1, 2:
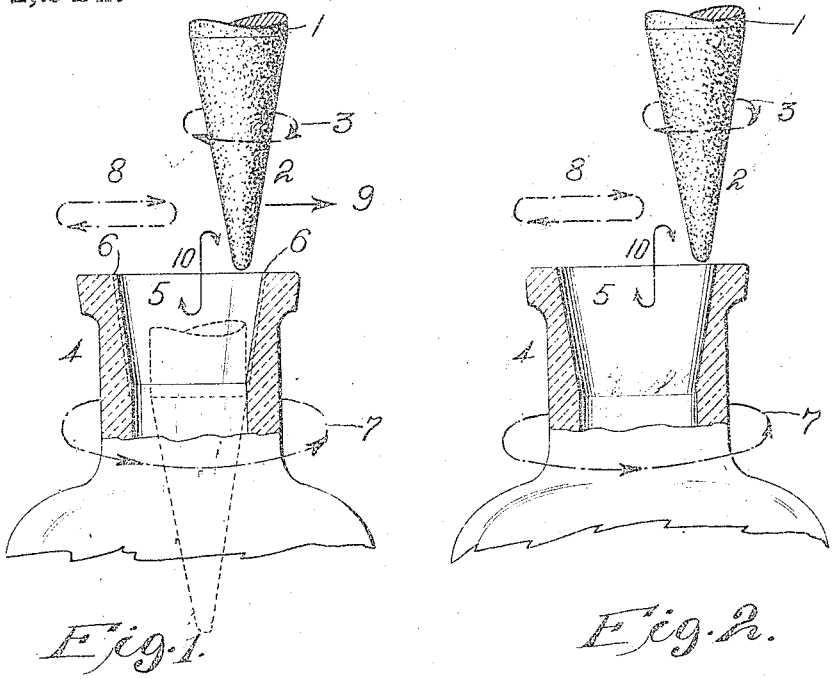

C. M. CONRADSON.
METHOD OF MAKING INTERCHANGEABLE GROUND GLASS BOTTLE NECKS AND GROUND GLASS STOPPERS THEREFOR.
APPLICATION FILED JUNE 13, 1908.

914,244.

Patented Mar. 2, 1909.

Witnesses
Harry C. Hebig
F. E. Nare

Inventor
Conrad M. Conradson
By his Attorney
Edmd S. Beach

UNITED STATES PATENT OFFICE.

CONRAD M. CONRADSON, OF MADISON, WISCONSIN, ASSIGNOR, BY MESNE ASSIGNMENTS, TO PRECISION GLASS GRINDING MACHINE COMPANY, OF SIOUX FALLS, SOUTH DAKOTA, A CORPORATION OF SOUTH DAKOTA.

METHOD OF MAKING INTERCHANGEABLE GROUND-GLASS BOTTLE-NECKS AND GROUND-GLASS STOPPERS THEREFOR.

No. 914,244.     Specification of Letters Patent.     Patented March 2, 1909.

Application filed June 13, 1908. Serial No. 438,280.

*To all whom it may concern:*

Be it known that I, CONRAD M. CONRADSON, citizen of the United States, residing at Madison, in the county of Dane and State of Wisconsin, have invented certain new and useful Improvements in Methods of Making Interchangeable Ground-Glass Bottle-Necks and Ground-Glass Stoppers Therefor, of which the following is a specification, reference being had therein to the accompanying drawings.

This invention relates to a process of grinding the interiors of glass bottle-necks and the exteriors of glass stoppers therefor.

The object of the invention is to produce a method by which interchangeable glass bottle-necks and glass stoppers may be effectively produced by various forms of glass-grinding mechanisms, so as to extend the field of ground glass bottles and stoppers by making them at such a low cost that they can be more generally used.

By my method I obviate the cumbersome and unduly expensive operations of the old art, the final result of which was, and is, the production of ground glass bottle-necks and stoppers, of which no stopper properly fits any bottle other than the particular bottle with which it was originally mated, and of which no bottle properly fits any other stopper than the particular one with which it was originally mated.

The ground-glass joint-forming art, as it relates to bottles and stoppers, has long been, and is, substantially as follows:—The truncated, cone-shaped interior surface of the glass bottle-neck, and the truncated, cone-shaped exterior surface of the glass stopper, whether blown or formed in molds, are initially untrue with reference to the geometrical axis of the truncated cone; that is, to the lengthwise axes of the bottles and stoppers. The said surfaces are also more or less rough; that is, of a more or less irregular, hill-and-dale condition. The first operation in the prior art is to give approximately proper form to the said surfaces. In the case of the bottle-neck, a so-called "lapping" tool rotatably mounted in a machine has been used. This tool is cone-shaped, and generally consists of a wooden core spirally wrapped with sheet iron. The workman with one hand holds the bottle on the free end of the rotating "lap", moving the bottle-neck back and forth on the "lap", longitudinally, while with the other hand he feeds between the "lap" and bottle-neck interior an abrasive mixture. This initial manual "lapping" operation is usually carried on until the desired quantity of bottle-necks has been "lapped." The stoppers are primarily put in a rotating chuck and roughed out by means of a "lap", generally consisting of a copper-faced strip of wood one end of which is mechanically held, the workman with one hand pressing the free end of this "lap" against the rotating stopper surface while feeding with the other hand abrasive material between the stopper and the "lap." Leaving the stoppers, *seriatim*, in the chuck, the workman takes the bottles, *seriatim*, and holding a bottle, in one hand, with the other hand feeds abrasive mixture between the opposed surfaces of the stopper and bottle-neck, moving the bottle-neck back and forth over the stopper until the joint-forming surfaces of the bottle are mated. On the best grade of work it is frequently the custom to put each stopper in its bottle, after the "lapping" operation, and oscillate them in relation one to another by hand to perfect the tightness of joint. In this old art, said surfaces are in fact used as tools for their own production, one surface modifying the other in such wise that there is no reasonable likelihood of interchangeable matability. Consequently, the further practice is to tie each stopper to its own bottle, so as to keep them together for storage and transportation, and for cleaning before shipment. In shipping, it is also usual to insert a bit of paper between each bottle-neck and its stopper, so as to prevent breakage. The jobbers and retailers also have to keep such bottles and stoppers in mated pairs, as received. By the old process, as a general rule, the said surfaces are neither properly round nor straight; and are therefore exceedingly apt to stick together; and the joints are not tight to the proof alcohol test except by careful manual grinding of each stopper in its own bottle. The practical resultant condition of the ground-glass joint art as it relates to bottles and stoppers is that the field of use thereof is comparatively restricted, such bottles and stoppers being unduly expensive and frequently unsatisfactory. It is a fact, moreover, that no one of said surfaces is uniformly finished, each surface being irregular at the best.

The advantages of the present invention are, elimination of the expense of time and labor of the old manual "lapping operation;" and the production of interchangeable bottlenecks and stoppers, which may be shipped separately and used indiscriminately, size for size.

I have hereinbefore referred to the truncated, cone shapes of bottle-necks and stoppers, because such is the general shape thereof; but my new method is readily applicable to cylindrically shaped glass bottlenecks and glass stoppers therefor as well as to the truncated, cone-shaped ones.

The deviation of the interior wall of glass bottle-necks and of the exterior wall of glass stoppers from their lengthwise axis is variable, but almost always present.

According to my new method, I subject the interior surfaces of the glass bottle-necks and the exterior surfaces of the glass stoppers, when in the irregular condition in which they come from the molds or glassblowers, first, to the action of a rotatable glass-grinding implement while the implement and glass are being forced or fed together or are in contact and also while the implement and glass are being moved one in relation to the other, to effect a continuous grinding from edge to edge of the glass surface to be ground. The glass-grinding implement to be used may be of various forms, such, for example, as a wheel or pencil. Preferably the glass-grinding implement is rotated simultaneously with the rotation of the glass in the opposite direction. The progressive grinding movement is obtained by endwise reciprocation of either or both the grinding implement and the glass one to the other, simultaneously with the rotative movement, and while the implement and glass are being pressed together or fed one against the other. By the first step in my process, a considerable amount of the superfluous and quite rough glass is gradually removed by the rotative, longitudinal and feed movements mentioned. By and during this first or initial step, the surface is brought approximately to its required size. The result of this initial step of my new process also is to make said joint-forming surfaces approximately equi-distant at any given transverse plane from the longitudinal axes of the glass bodies by the spiral grinding operation effected by said movements. The second step in my new method is to subject the initially and spirally ground and sized surface to a rotative, progressive finishing action of the glass-grinding tool, without pressing or feeding the glass and tool together positively, the tool and article being maintained, however, in such relation one to the other that there is some pressure between them so as to smooth the surface operated upon. The result of this second step is to spirally grind the initially treated surface in all parts, whereby a ground joint-forming surface of substantially uniform and smooth configuration is obtained. If the working surface of the glass-grinding implement is of sufficiently fine abrasive material, and the glass is subjected repeatedly to its action, without pressure or feed positively (as herein explained) of the glass and implement one against the other, the ground surface finally produced may be of an approximately plate-glass finish; but even in such case the surface will theoretically, and therefore actually, be produced by uniform spiral cuttings of an infinitesimal nature in the glass. The simultaneous movements of the first step alluded to have their own peculiar effect in smoothing off or reducing the major irregularities in the glass surfaces as they are produced in molding and blowing; while the simultaneous rotative movement of the glass-grinding implement and the to-and-fro movement of the implement and glass, without the feeding movement, is peculiarly one of smoothing effect.

Figure 3:
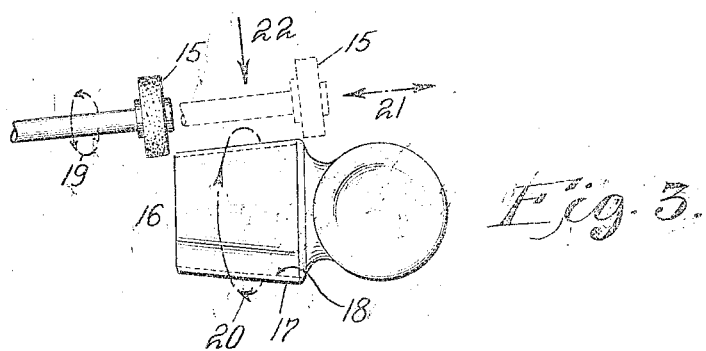
Figure 4:
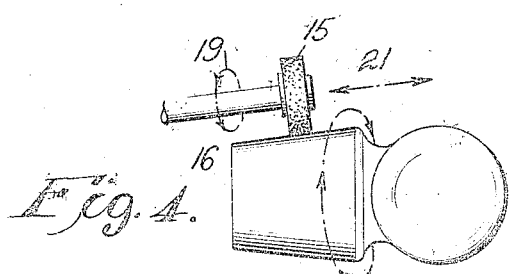

In the accompanying drawings illustrating the principle of my invention, Figure 1 is a view showing, in full lines, a glass-cutting pencil in entering position relatively to the bottle-neck, shown in vertical central section. Dotted lines in the bottle indicate an amount of superfluous rough glass to be removed; and other dotted lines indicate the position of the pencil at the completion of the initial grinding movement. Conventional arrow signs indicate (1) the rotatability of the pencil; (2) the reverse rotatability of the bottle-neck; (3) the relative endwise movement or traverse of the pencil and bottle, one to the other; and (4) the lateral or feed movement. Fig. 2 shows the pencil in one of its smoothing positions during the second step of the method relatively to the bottle-neck, shown in vertical central section, and from which the superfluous glass indicated in Fig. 1 has been removed. Conventional arrow signs indicate (1) the rotatability of the pencil; (2) the rotatability of the bottle-neck; and (3) the relative endwise movement or traverse of the pencil and bottle, one to the other. Fig. 3 shows, in full lines, a glass-grinding wheel at the beginning of its operation in the first step of the method relatively to a glass stopper, whereon dotted lines indicate an amount of superfluous glass to be removed. Dotted lines also indicate the final operation of the wheel on the stopper. Conventional arrow signs indicate (1) the rotatability of the wheel; (2) the reverse rotatability of the stopper; (3) the traversing movement of the wheel and stopper, one to the other, and (4) the lateral or feed movement of the wheel and stopper, one to the other. Fig. 4 shows, in full lines, the stopper after the superfluous glass indicated in Fig. 3 has been removed, with the wheel in one of its grinding positions of the second step of the method. Conventional arrow signs indicate (1) the rotatability of the wheel; (2) the reverse rotatability of the stopper; and (3) the relative traverse of the wheel and stopper.

In Figs. 1 and 2, the glass grinding implement is shown as a pencil 1 having a working face 2 which is preferably cone-shaped. The pencil is rotatable as indicated by the arrow sign 3. The glass bottle-neck 4, in Fig. 1 is shown with superfluous rough, uneven glass 5 on its interior. This glass is to be removed to the dotted lines 6 in the first step of the method. The bottle neck is rotatable in a direction reverse to the direction of the pencil, as indicated by the arrow sign 7. It is to be understood, however, that either the pencil or bottle-neck may be non-rotative if preferred. The point is that there should be a rotative movement one to the other of the pencil and bottle-neck, and that it is generally desirable to have both rotate, one in a direction the reverse of the other. In the present instance the rotation of both is indicated by the arrow sign 8. The lateral or feed movement of the working face of the pencil in relation to the superfluous glass 5 is indicated by the arrow sign 9. The longitudinal movement or traverse of the pencil and bottle-neck is indicated by the arrow sign 10. It is not necessary in case of either the feed or traverse movements that both pencil and bottle-neck be moved; it is sufficient if one of them be moved relative to the other to effect the feed or the traverse. In the case of the feed, it is preferable to move the pencil up to the work and press the pencil against the work during the rotative and traverse movements until the line 6 is reached. When the rough and more or less brittle glass has been ground down to line 6 by the three combined movements,—(1) the feed, (2) the rotative and (3) the traverse,—the first step of the method is completed. It then remains to perfect the actual joint-forming surface by smoothing it, as indicated in Fig. 2, and this is effected by the combined rotative and traverse motions without the lateral or feeding movement; the omission of the feeding movement causes the rotative and traverse movements to effect a very perfect and regular surface for purposes already described.

By the term "feeding movement" herein I refer to a positive or actual feeding movement. It is to be noted that a positive feed movement would prevent the requisite smoothing of the joint-forming surface, while the combined rotative and traverse movements (without a positive feed movement) do effect the requisite smoothing of such surface, because, during such combined movement, the contact of the grinding tool with the glass is, in respect to the traverse movement, a mere sliding contact whereby the necessary gentle or polishing abrasion of the joint-forming surface is obtained.

In Figs. 3 and 4, the glass-grinding implement is in the form of an abrasive wheel 15. In Fig. 3, the wheel is shown working on the exterior surface of a glass bottle stopper 16, the portion 17 of which is to be removed down to the dotted line 18. Arrow sign 19 indicates the rotatability of the wheel; arrow sign 20 indicates the rotatability of the stopper preferably in the reverse direction; arrow sign 21 indicates the relative traverse of the wheel and stopper; and arrow sign 22 represents the feed movement. The superfluous glass 17 having been removed down to the dotted line 18, the first step of the method is completed and the smoothing of the second step is effected, as indicated in Fig. 4, by the combined rotative and traverse movements without positive feeding movement.

It is to be understood that mechanisms of various types may be constructed for effecting the movements indicated by the arrow signs, whereby the brittle glass may be treated as herein indicated for the production of interchangeable ground glass bottle-necks and stoppers.

Having then set forth the principle of my invention and the present method of transforming the rough and uneven surfaces mentioned, into uniform joint-forming surfaces, what I claim is:

The method of making interchangeable ground glass bottle-necks and stoppers therefor, consisting in subjecting the surface to be ground to rotative, feeding and traversing action of a glass-grinding implement to remove superfluous glass surrounding the axis of the glass to be ground and to bring said surface equi-distant in any given transverse plane from said axis; and in then subjecting such initially ground surface to the simultaneous rotative and traversing polishing action of the grinding implement, whereby the initially ground glass surface is uniformly finished with reference to the axis of the glass body.

In testimony whereof I have affixed my signature in presence of two witnesses.

CONRAD M. CONRADSON.

Witnesses:
 EDWARD S. BEACH,
 G. BLAKE.